(12) United States Patent
Kuhara et al.

(10) Patent No.: US 7,366,428 B2
(45) Date of Patent: *Apr. 29, 2008

(54) OPTICAL RECEIVER

(75) Inventors: Yoshiki Kuhara, Suita (JP); Mitsuaki Nishie, Yokohama (JP); Shigeo Hayashi, Yokohama (JP)

(73) Assignee: Sumitomo Electric Indutries, Ltd., Osaka (JP)

( * ) Notice: Subject to any disclaimer, the term of this patent is extended or adjusted under 35 U.S.C. 154(b) by 509 days.

This patent is subject to a terminal disclaimer.

(21) Appl. No.: 10/940,529

(22) Filed: Sep. 14, 2004

(65) Prior Publication Data
US 2005/0082524 A1   Apr. 21, 2005

(30) Foreign Application Priority Data
Sep. 16, 2003   (JP) ............... 2003-323474

(51) Int. Cl.
*H04B 10/06*   (2006.01)
(52) U.S. Cl. ............ 398/202; 398/207; 398/208; 398/209; 398/212; 398/213
(58) Field of Classification Search ............. 398/15, 398/17, 22–24, 26, 27, 33, 34, 38, 93–95, 398/162, 192, 195–198, 202, 206–209, 212–214
See application file for complete search history.

(56) References Cited

U.S. PATENT DOCUMENTS

| | | | | |
|---|---|---|---|---|
| 5,321,543 A | * | 6/1994 | Huber | 398/194 |
| 5,331,452 A | * | 7/1994 | Smyth et al. | 398/202 |
| 5,491,548 A | * | 2/1996 | Bell et al. | 356/73.1 |
| 5,568,302 A | * | 10/1996 | Puzey | 398/131 |
| 6,088,142 A | * | 7/2000 | Cao et al. | 398/95 |
| 7,067,854 B2 | | 6/2006 | Kuhara et al. | |
| 7,127,183 B2 | * | 10/2006 | Oguma | 398/192 |
| 7,139,491 B2 | * | 11/2006 | Katagiri et al. | 398/195 |
| 7,302,193 B2 | | 11/2007 | Kuhara et al. | |

FOREIGN PATENT DOCUMENTS

| | | |
|---|---|---|
| JP | 63077171 | 4/1988 |
| JP | 63105541 | 5/1988 |
| JP | 63-193078 | 8/1988 |
| JP | 06-132899 | 5/1994 |
| JP | 11-040840 | 2/1999 |
| JP | 2000-252775 | 9/2000 |
| JP | 2002-222963 | 8/2002 |

\* cited by examiner

*Primary Examiner*—Dalzid Singh
(74) *Attorney, Agent, or Firm*—Fish & Richardson P.C.

(57) ABSTRACT

An optical receiver includes a light-receiving part and a control part. The light-receiving part includes an APD, a PIN-PD, and a branching optical device. First signal light is incident on the light-receiving part and is divided into second signal light and third signal light which are incident on the APD and the PIN-PD, respectively, by the branching optical device. Due to this structure, the third signal light is incident on the PIN-PD without the quantity thereof being varied depending on the polarization state of the first signal light. The control part generates a supply voltage at which a desired avalanche multiplication factor is obtained in the APD on the basis of the output current from the PIN-PD. According to the above-described structure, the avalanche multiplication factor of the APD is accurately controlled on the basis of the output current of the PIN-PD.

12 Claims, 10 Drawing Sheets

OPTICAL RECEIVER

BACKGROUND OF THE INVENTION

1. Field of the Invention

The present invention relates to an optical receiver which detects signal light with an avalanche photodiode.

2. Description of the Background Art

In an optical communication system, an optical receiver employing an avalanche photodiode (hereafter abbreviated as APD) as a photodetector is used conventionally. APDs have a function to amplify signal photocurrents and are suitable for use as photodetectors in optical fiber communication systems using weak optical signals.

A typical APD has a characteristic that an avalanche multiplication factor thereof varies due to temperature variation or the like. This is due to a relatively high reverse bias voltage applied to the APD when avalanche multiplication is performed. More specifically, the APD is operated at a voltage close to a break-down voltage of a PN junction, and therefore the operating characteristics of the APD are extremely sensitive to variation in ambient temperature or the like. Accordingly, the avalanche multiplication factor of the APD is preferably controlled such that a constant multiplication factor can be obtained even when temperature variation or the like occurs.

Japanese Unexamined Patent Application Publication No. 63-77171 discloses an optical receiver having a structure for controlling a multiplication factor of an APD. The structure of this optical receiver is shown in FIG. 10(a). This optical receiver has an optical-signal-receiving area 101 and an optical-signal-monitoring area 102 on a common substrate, and receives signal light from an optical fiber 103 at these areas. An avalanche photodiode is provided in the optical-signal-receiving area 101, and a multiplication factor at the optical-signal-receiving area 101 is controlled on the basis of an output current value obtained at the optical-signal-monitoring area 102.

In addition, Japanese Unexamined Patent Application Publication No. 63-105541 discloses another optical receiver having a different structure for controlling a multiplication factor of an APD. The structure of this optical receiver is shown in FIG. 10(b). This optical receiver includes an APD 111 and a photodiode 112. The APD 111 receives signal light emitted from an optical fiber 113, and the photodiode 112 receives signal light reflected by a light-receiving area of the APD 111. The multiplication factor of the APD 111 is controlled on the basis of an output current value obtained by the photodiode 112.

In the optical receiver disclosed in Japanese Unexamined Patent Application Publication No. 63-77171, the optical-signal-receiving area 101 and the optical-signal-monitoring area 102 are formed adjacently on the same plane of the same substrate. Therefore, it is highly likely that crosstalk will occur between the optical-signal-receiving area 101 and the optical-signal-monitoring area 102. When the crosstalk occurs, the accuracy of detection of the signal light at the optical-signal-monitoring area 102 is reduced and it is therefore difficult to control the multiplication factor at the optical-signal-receiving area 101 with high accuracy.

In the optical receiver disclosed in Japanese Unexamined Patent Application Publication No. 63-105541, the signal light is incident on the APD 111 inevitably at an angle. However, when the signal light is incident on the light-receiving area of the APD 111 at an angle, the reflectance of the signal light varies depending on the polarization state of the signal light. Although the dependency on the polarization state can be eliminated by forming a multilayer film, it is difficult to form the multilayer film on the light-receiving area of the APD 111, which is a semiconductor device. Therefore, in this optical receiver, the quantity of signal light incident on the photodiode 112 varies depending on the polarization state of the signal light emitted from the optical fiber 113, and it is difficult to control the avalanche multiplication factor of the APD 111 with high accuracy.

SUMMARY OF THE INVENTION

In view of the above-described problem, an object of the present invention is to provide an optical receiver in which an avalanche multiplication factor of an APD can be accurately controlled.

In order to attain the above-described object, according to one embodiment of the present invention, an optical receiver for receiving signal light includes an avalanche photodiode having a light-receiving area; a PIN photodiode having a light-receiving area and disposed separately from the avalanche photodiode; and a half mirror for receiving the signal light and dividing the signal light into two signal-light components, the half mirror being optically coupled to the light-receiving area of the avalanche photodiode and the light-receiving area of the PIN photodiode such that one of the signal-light components is incident on the light-receiving area of the avalanche photodiode and the other one of the signal-light components is incident on the light-receiving area of the PIN photodiode.

In the above-described optical receiver, the signal light is divided by the half mirror, on which a multilayer film for reducing the dependency on the polarization state can be easily formed. Accordingly, the signal-light components can be incident on the PIN photodiode (hereafter abbreviated as PIN-PD) and the avalanche photodiode (hereafter abbreviated as APD) in a manner such that the quantities of the signal-light components do not vary depending on the polarization state of the signal light. Moreover, the APD and the PIN-PD are disposed separately from each other so that crosstalk between the APD and the PIN-PD can be prevented. Thus, in the above-described optical receiver, the avalanche multiplication factor of the APD can be accurately controlled on the basis of the output current of the PIN-PD.

According to another embodiment of the present invention, an optical receiver for receiving signal light includes an avalanche photodiode having a light-receiving area; a PIN photodiode having a light-receiving area and disposed separately from the avalanche photodiode; and an optical waveguide including a first portion extending from a first end at which the signal light enters the optical waveguide to a branching-off point, a second portion extending from the branching-off point to a second end, and a third portion extending from the branching-off point to a third end, the second end of the optical waveguide being optically coupled to the light-receiving area of the avalanche photodiode and the third end of the optical waveguide being optically coupled to the light-receiving area of the PIN photodiode.

In this optical receiver, the signal light is divided into signal-light components at the branching-off point of the optical waveguide. Accordingly, the signal-light components are incident on the PIN-PD and the APD without being affected, in terms of the quantities of the signal-light, by the polarization state of the signal light. In addition, crosstalk between the APD and the PIN-PD can be prevented by disposing the APD and the PIN-PD separately from each other. Thus, in the above-described optical receiver, the avalanche multiplication factor of the APD can be accurately controlled on the basis of the output current of the PIN-PD.

The optical receiver may further include a control means for controlling, on the basis of an output current value obtained from the PIN photodiode, either one or both of a current flowing through the avalanche photodiode and a supply voltage applied to the avalanche photodiode such that an avalanche multiplication factor of the avalanche photodiode is maintained at a predetermined value. With such configuration, the avalanche multiplication factor of the APD can be suitably controlled.

In this optical receiver, the control means may control either one or both of the supply voltage applied to the avalanche photodiode and the current flowing through the avalanche photodiode such that an average output current value obtained from the avalanche photodiode when the signal light is incident approaches the value of $m \cdot Ipin_1 \cdot (Iava_2/Ipin_2)$, where $Iava_2$ is an output current value in a PIN mode of the avalanche photodiode at a time when a quantity of light is incident and $Ipin_2$ is an output current value of the PIN photodiode at that time, m is a desired avalanche multiplication factor, and Ipin1 is the value of an output current from the PIN photodiode. Accordingly, the desired avalanche multiplication factor is obtained with high accuracy.

The control means of the optical receiver may be provided with: a converting circuit for converting the output current value obtained from the PIN photodiode into a voltage signal; a current mirror circuit having an input, a first output, and a second output, the amount of current at the second output being designed to be substantially equal to the amount of current at the first output, and the first output being connected to the avalanche photodiode; a power supply circuit for supplying the supply voltage to the input of the current mirror circuit; and a voltage control circuit for controlling the supply voltage on the basis of the voltage signal obtained from the converting circuit and the amount of current at the second output of the current mirror circuit. In this optical receiver, the supply voltage applied to the APD is controlled on the basis of the amount of current at the second output using the fact that the amount of current at the second output of the current mirror circuit is substantially equal to the amount of current supplied to the APD from the first output of the current mirror circuit. Accordingly, the avalanche multiplication factor of the APD can be more suitably controlled.

Alternatively, in the optical receiver, the control unit may include a converting circuit for converting the output current value obtained from the PIN photodiode into a voltage signal; a current mirror circuit having an input, a first output, and a second output, the amount of current at the second output being substantially equal to the amount of current at the first output and the second output being connected to the avalanche photodiode; a power supply circuit for supplying the supply voltage to the input of the current mirror circuit; and a current control circuit for controlling the amount of current at the first output of the current mirror circuit on the basis of the voltage signal obtained from the converting circuit. In this optical receiver, the amount of current supplied to the APD from the second output is controlled by controlling the amount of current at the first output using the fact that the amount of current at the second output of the current mirror circuit is substantially equal to the amount of current supplied to the APD from the first output of the current mirror circuit. Accordingly, the avalanche multiplication factor of the APD can be more suitably controlled.

As described above, in the optical receiver of the present invention, the avalanche multiplication factor of the APD can be accurately controlled on the basis of the output current of the PIN-PD.

DETAILED DESCRIPTION OF THE INVENTION

Figure 1:
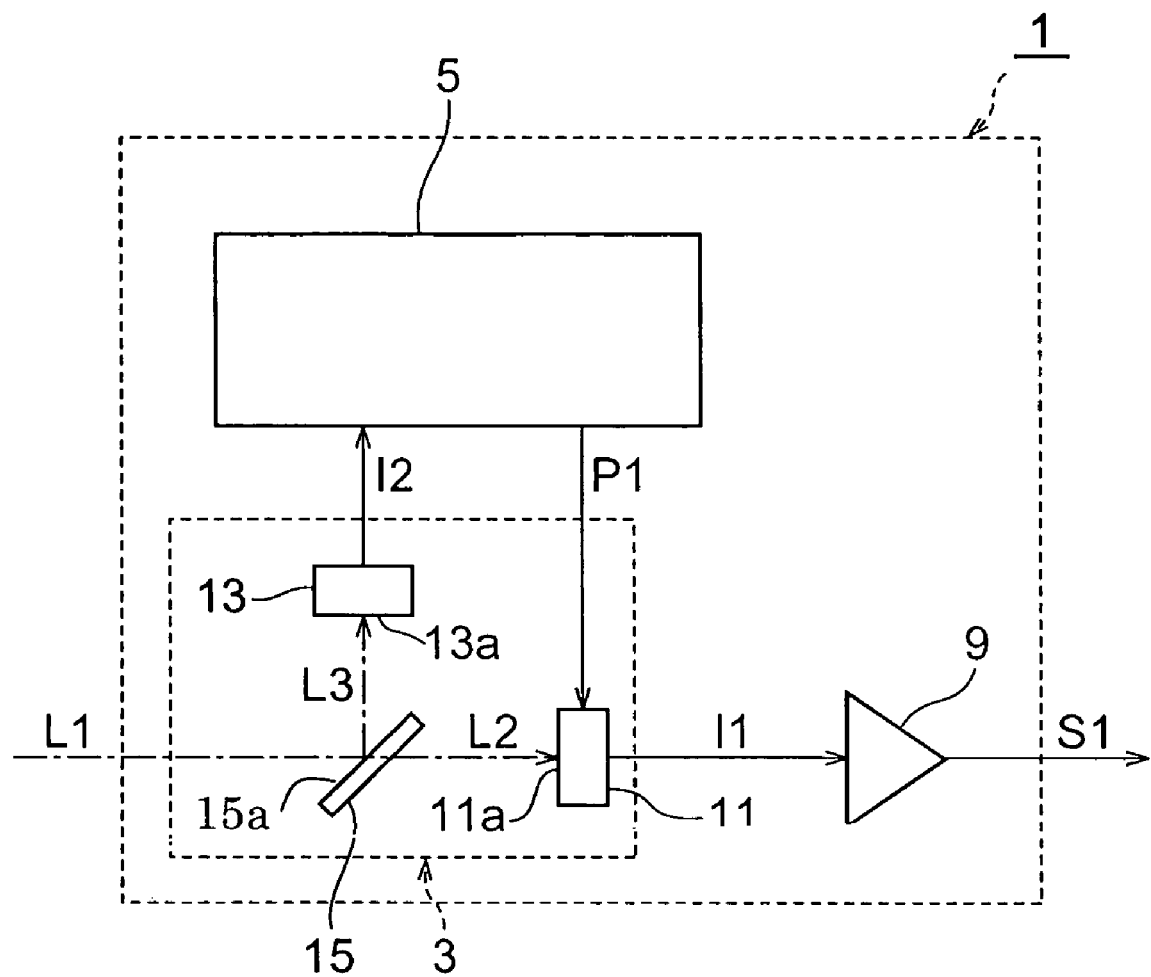
FIG. 1 is a block diagram showing an optical receiver according to an embodiment of the present invention.

Embodiments of optical receivers according to the present invention will be described below with reference to the accompanying drawings. In the figures, similar components are denoted by the same reference numerals and redundant explanations are thus omitted.

EMBODIMENT

FIG. 1 is a block diagram showing an optical receiver according to an embodiment of the present invention. With reference to FIG. 1, an optical receiver 1 according to the present embodiment includes a light-receiving part 3, a control part 5, and an amplifier 9. The light-receiving part 3 includes an APD 11, a PIN-PD 13, and a half mirror 15.

The light-receiving part 3 is structured such that signal light L1 input from the outside of the optical receiver 1 is divided at the half mirror 15 into two directions: signal light L2 is incident on a light-receiving area 11a of the APD 11 and the signal light L3 is incident on a light-receiving area 13a of the PIN-PD 13. In the present embodiment, a part of the signal light L1 is reflected by a reflective surface 15a of the half mirror 15 as the signal light L3, and the remaining part of the signal light L1 passes through the half mirror 15 as the signal light L2. At this time, the reflectance of the half mirror 15 is preferably set such that 1% to 10% of the signal light L1 is reflected as the signal light L3 and the remaining part, that is, 90% to 99% of the signal light L1 passes through the half mirror 15 as the signal light L2.

The APD 11 converts the signal light L2 into an output current I1. A cathodic electrode of the APD 11 is electrically connected to the control part 5, and an anodic electrode of the APD 11 is electrically connected to the amplifier 9. The APD 11 is activated when the cathodic electrode receives a supply voltage P1 from the control part 5, and generates the output current I1 corresponding to the signal light L2 when the signal light L2 is incident on the light-receiving area 11a. At this time, in the APD 11, a photocurrent generated when the signal light L2 is incident is multiplied at a predetermined multiplication factor due to the avalanche multiplication function, and thus the output current I1 is generated. The APD 11 supplies the generated output current I1 to the amplifier 9 from the anodic electrode thereof. The amplifier 9 generates a received signal S1 by converting the output current I1 obtained from the APD 11 into a voltage signal and amplifying it, and supplies the received signal S1 to the outside of the optical receiver 1.

The PIN-PD 13 converts the signal light L3 into an output current I2. The PIN-PD 13 is placed separately from the APD 11. A cathodic electrode of the PIN-PD 13 is electrically connected to a predetermined power-supply terminal (not shown), and an anodic electrode of the PIN-PD 13 is electrically connected to the control part 5. The PIN-PD 13 generates the output current I2 corresponding to the signal light L3 when the signal light L3 is incident on the light-receiving area 13a. The PIN-PD 13 supplies the generated output current I2 to the control part 5 from the anodic electrode thereof.

The control part 5 is a control means according to the present embodiment, and controls the supply voltage P1, which is applied to the APD 11, on the basis of the output current value obtained from the PIN-PD 13 so that the avalanche multiplication factor of the APD 11 may be maintained at a predetermined value. More specifically, the control part 5 detects the quantity of signal light L3 on the basis of the output current I2 obtained from the PIN-PD 13. The control part 5 generates, based on the quantity of signal light L3, the supply voltage P1 to be applied to the APD 11 such that the APD 11 performs, at a desired multiplication factor, avalanche multiplication of the photocurrent generated in accordance with the quantity of signal light L2. The control part 5 may be, for example, an arithmetic unit including a central processing unit (CPU), an electric circuit, etc.

Figure 2:
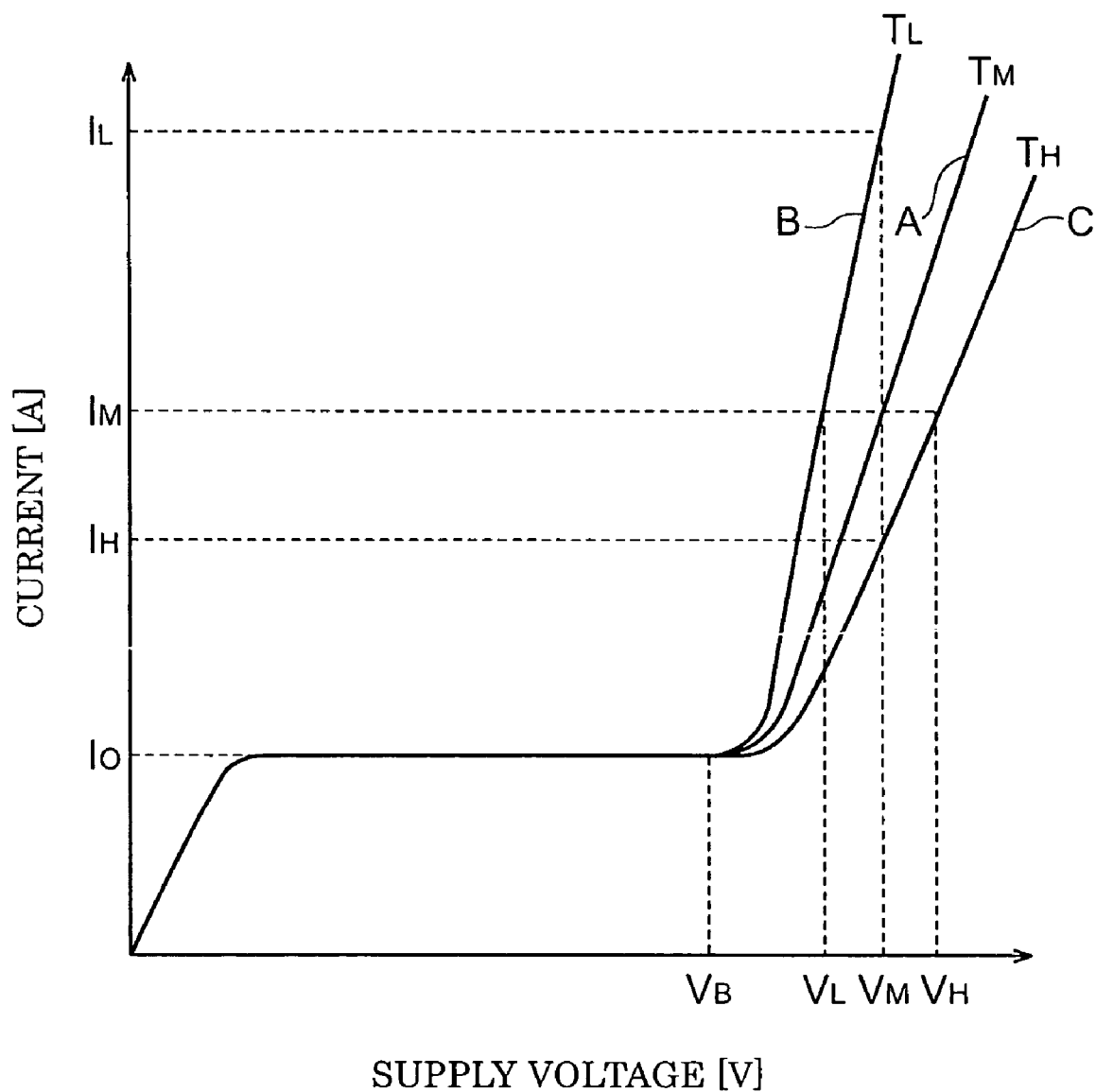
FIG. 2 is a graph showing the characteristics of output current of an APD versus a supply voltage applied thereto.

The above-described function of the control part 5 will be described in more detail below. FIG. 2 is a graph showing the characteristics of output current of an APD versus a supply voltage applied thereto. In the graph shown in FIG. 2, it is assumed that the quantity of light incident on the light-receiving area 11a of the APD 11 is constant. With reference to FIG. 2, the APD 11 generates a photocurrent $I_0$ corresponding to the quantity of incident light when a supply voltage lower than a predetermined voltage $V_B$ is applied to the APD 11 (this state is called a PIN mode in the APD 11). When a supply voltage higher than the predetermined voltage $V_B$ is applied to the APD 11, the APD 11 performs the avalanche multiplication function and the output current value obtained from the APD 11 is thus equivalent to the product of the photocurrent $I_0$ and a predetermined multiplication factor.

The avalanche multiplication is caused by a relatively high reverse bias voltage being applied to the APD 11. At this time, the APD 11 works at a voltage close to a breakdown voltage of a PN junction, and therefore the operating property is highly sensitive to the variation in the temperature of the APD 11 or the like. For example, in the graph of FIG. 2, the curves A, B, and C are obtained when the temperature of the APD 11 is $T_M$, $T_L$, and $T_H$, respectively ($T_L < T_M < T_H$). Thus, even when the quantity of light is constant and the supply voltage applied to the APD 11 is fixed (for example, $V_M$), the output current value obtained from the APD 11 varies to $I_H$, $I_M$, and $I_L$, depending on the temperature variation.

In the graph shown in FIG. 2, for example, in order to obtain an output current of $I_M (=m \cdot I_0)$, where m is a desired avalanche multiplication factor) with a predetermined quantity of incident light, the supply voltage value should be changed to $V_L$, $V_M$, and $V_H$, corresponding to the variation in the properties of the APD 11. Conventionally, a method is used in which the temperature of the APD is detected using a thermistor or the like and the supply voltage is changed depending on the temperature of the APD. However, it is difficult to obtain the desired avalanche multiplication factor m with high accuracy by this method, since an APD has its own temperature characteristics different from those of other APDs.

In comparison, the control part 5 according to the present embodiment controls the avalanche multiplication factor of the APD 11 on the basis of the output current I2 obtained from the PIN-PD 13. First, a quantity of light is caused to be incident on the optical receiver 1, and the value of the output current I1 obtained by the APD 11 in the PIN mode and the value of the output current I2 obtained by the PIN-PD 13 at that time are defined as $Iava_2$ (A) and $Ipin_2$ (A), respectively. The supply voltage P1 is controlled such that the average value of the output current I1 obtained by the APD 11 when the signal light L2 is incident on the APD 11 approaches $m \cdot Ipin_1 \cdot (Iava_2/Ipin_2)$, where m is the desired avalanche multiplication factor and Ipin1 is the current value (A) of the output current I2 obtained by the PIN-PD 13 corresponding to the signal light L3. Accordingly, the desired avalanche multiplication factor m is obtained in the APD 11 without being affected by the temperature variation or the like. The average value of the output current I2 is the time average of the output current I2 corresponding to the coded signal light L1 (L2) over a sufficiently long time covering a plurality of codes. The average value of the output current I2 is obtained using, for example, an integrating circuit.

Figure 3:
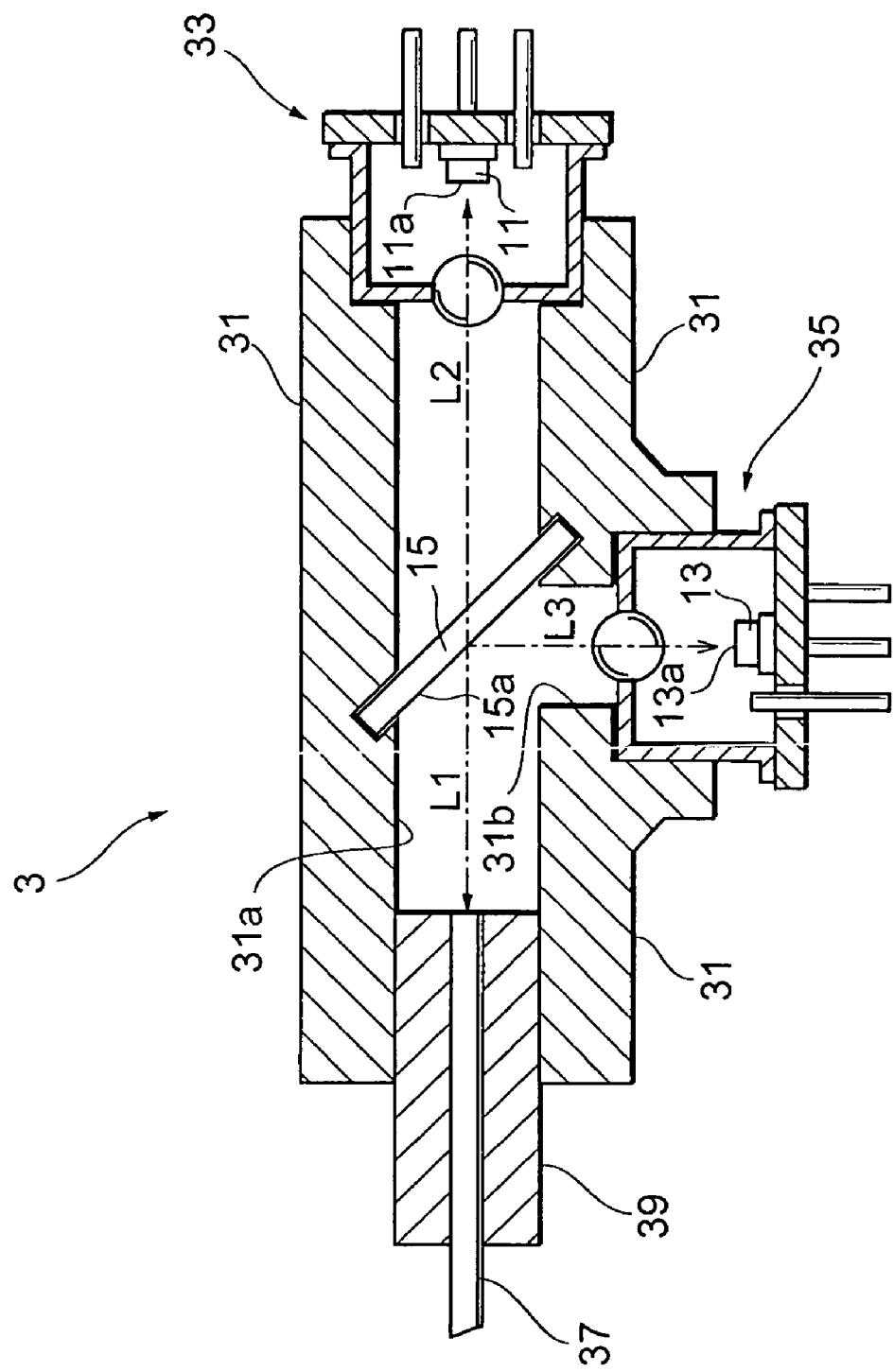
FIG. 3 is a sectional view showing a light-receiving part according to the present embodiment.

Next, the light-receiving part 3 will be described in detail below. FIG. 3 is a sectional view showing the light-receiving part 3 according to the present embodiment. With reference to FIG. 3, the light-receiving part 3 includes an APD module 33, a PIN-PD module 35, the half mirror 15, a package 31, a ferrule 39, and an optical fiber 37.

The package 31 retains the APD module 33, the PIN-PD module 35, the half mirror 15, and the optical fiber 37 at predetermined positions. The package 31 has a tubular shape which extends along a predetermined axis, and is composed of, for example, stainless steel. Alternatively, the package 31 may also be composed of resin such as epoxy resin. The package 31 has a through hole 31a which extends through the package 31 along the predetermined axis and a through hole 31b which branches from the through hole 31a at the middle position thereof and extends through the wall of the package 31 along a direction different from the predetermined axis. The ferrule 39 and the optical fiber 37 are inserted into the through hole 31a at one end thereof, and the APD module 33 is fixed at the other end of the through hole 31a. The PIN-PD module 35 is fixed at an outer end of the through hole 31b (the end at the outer surface of the package 31). The half mirror 15 is provided at the point where the through hole 31b branches off from the through hole 31a.

In the present embodiment, the signal light L1 is divided into the signal light L2 and the signal light L3 by the half mirror 15. The half mirror 15 is optically coupled to the APD module 33 and the PIN-PD module 35, and the signal light L2 and the signal light L3 are incident on the APD module 33 and the PIN-PD module 35, respectively.

The half mirror 15 is composed of, for example, a glass plate or a polyimide plate, and a multilayer film including several tens to a hundred layers is formed on the reflective surface 15a of the half mirror 15. This multilayer film is provided for the purpose of eliminating the polarization dependency at the half mirror 15. More specifically, when a part of the signal light L1 is reflected by the half mirror 15 so as to become signal light L3, the multilayer film prevents the quantity of the signal light L3 from varying depending on the polarization state of the signal light L1.

Figure 4:
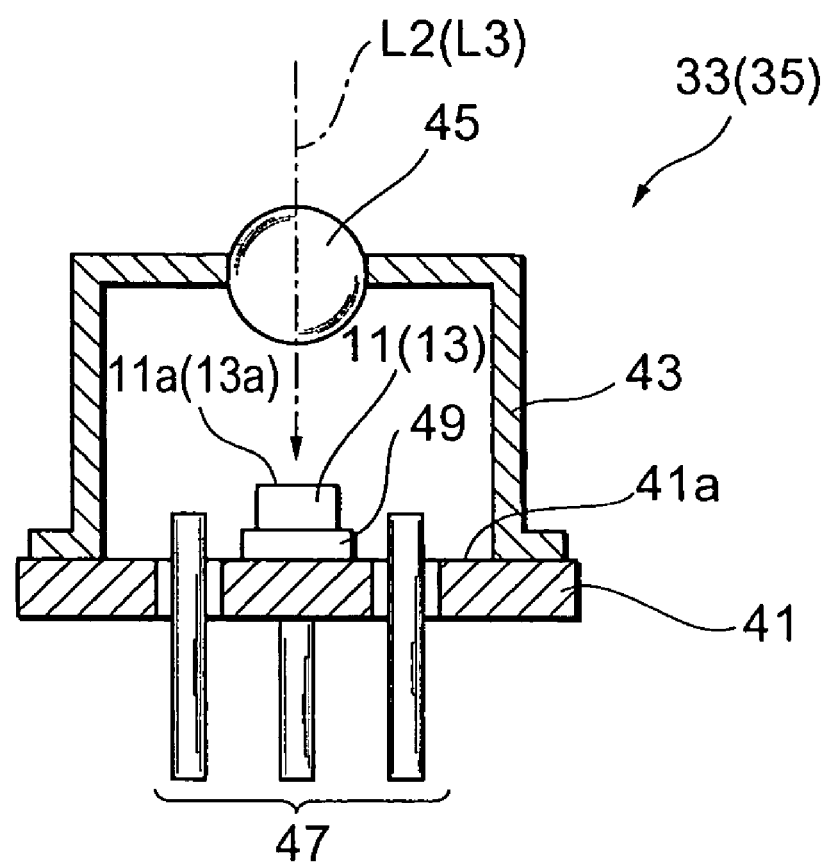
FIG. 4 is a sectional view of an APD module or a PIN-PD module.

FIG. 4 is a sectional view showing either of the APD module 33 and the PIN-PD module 35. With reference to FIG. 4, the APD module 33 (PIN-PD module 35) has a structure of a so-called coaxial-type CAN package, and includes a stem 41, a cap 43, a lens 45, the APD 11 (PIN-PD 13), a mount 49, and lead pins 47.

The stem 41 is a disc-shaped member having a diameter of, for example, 5.6 mm, and is composed of a metal material such as stainless steel, copper, and iron. A plurality of lead pins 47 are attached to the stem 41 such that they extend through the stem 41 in the thickness direction. The mount 49 is disposed on a principal plane 41a of the stem 41, and the APD 11 (PIN-PD 13) is mounted on the mount 49. The anodic electrode and the cathodic electrode of the APD 11 (PIN-PD 13) are electrically connected to some of the lead pins 47, and the APD 11 (PIN-PD 13) supplies the output current I1 (I2) to the outside of the light-receiving part 3 via the lead pins 47. In the present embodiment, the lead pins 47 of the APD module 33 are electrically connected to the control part 5 and the amplifier 9 (see FIG. 1), and the lead pins 47 of the PIN-PD module 35 are electrically connected to the control part 5 and a predetermined power-supply terminal.

The cap 43 covers the APD 11 (PIN-PD 13) and the mount 49. The cap 43 has a cylindrical shape with its one end closed, and is composed of, for example, a metal material such as stainless steel, steel, iron-nickel alloy, or brass. The cap 43 is fixed to the stem 41 such that the other end of the cap 43 is in contact with the principal plane 41a of the stem 41. The ball lens 45 is provided at the closed end of the cap 43, and is optically coupled to the light-receiving area 11a (13a) of the APD 11 (PIN-PD 13). The lens 45 converges the signal light L2 (L3), and then the signal light L2 (L3) is incident on the light-receiving area 11a (13a) of the APD 11 (PIN-PD 13).

Figure 5:
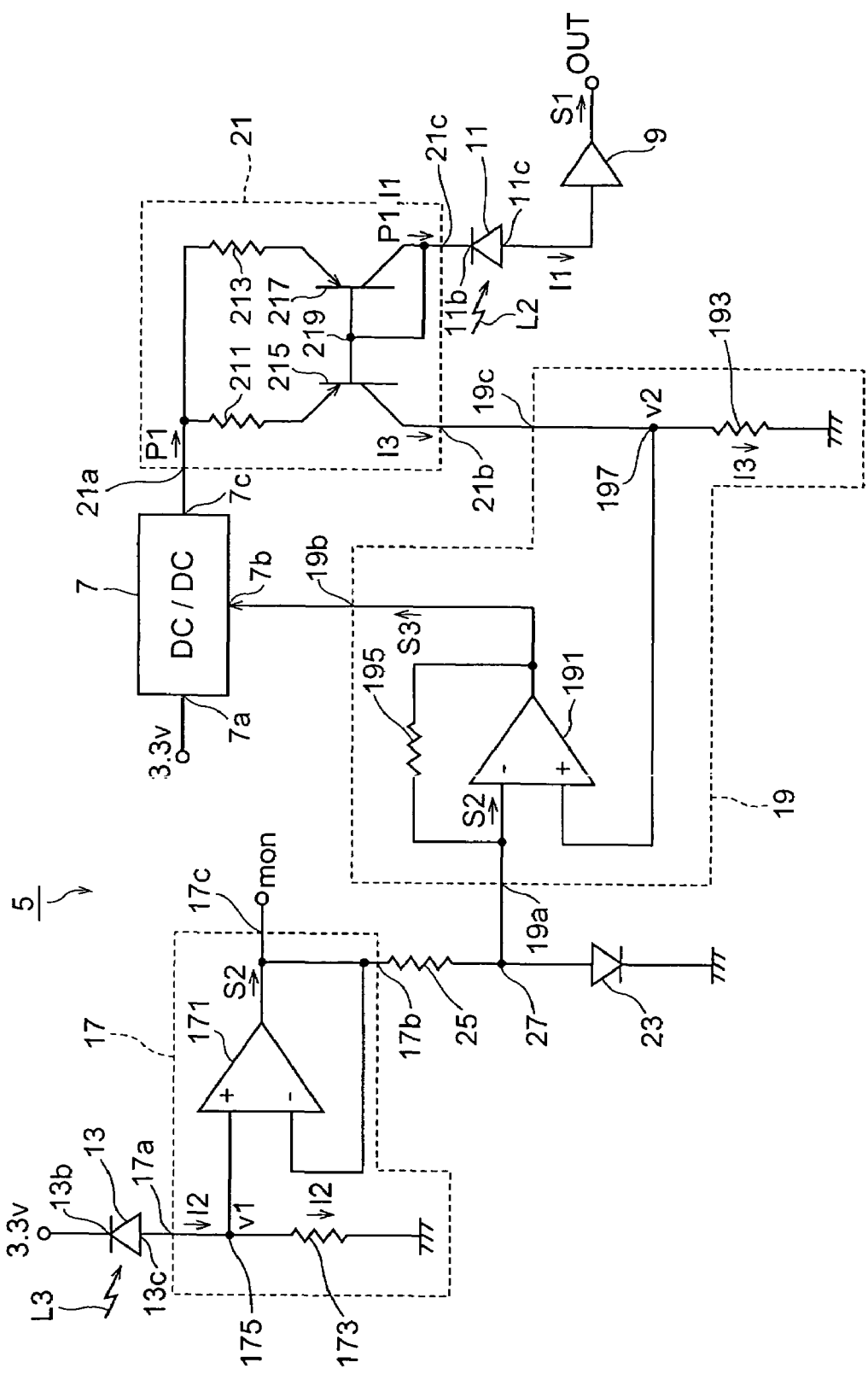
FIG. 5 is a circuit diagram showing an internal circuit of a control part.

Next, the control part 5 will be described in detail below. FIG. 5 is a circuit diagram showing an internal circuit of the control part 5.

With reference to FIG. 5, the control part 5 includes a DC-DC converter 7, a converting circuit 17, a current mirror circuit 21, and a voltage control circuit 19. The DC-DC converter 7 is used as a power supply circuit in the present embodiment, and has inputs 7a and 7b and an output 7c. The input 7a is electrically connected to a power-supply terminal of a predetermined voltage (for example, 3.3 V). The output 7c is electrically connected to the current mirror circuit 21. The input 7b is electrically connected to the voltage control circuit 19, and the DC-DC converter 7 receives a control signal S3, which will be described below, from the voltage control circuit 19. The DC-DC converter 7 transforms the supply voltage from the power-supply terminal on the basis of the control signal S3, and generates the supply voltage P1. Then, the DC-DC converter 7 supplies the supply voltage P1 to the current mirror circuit 21 from the output 7c.

The current mirror circuit 21 includes resistance elements 211 and 213 and PNP transistors 215 and 217. In addition, the current mirror circuit 21 has an input 21a, an output 21b (second output), and an output 21c (first output). In the current mirror circuit 21, the amount of current at the output 21b is substantially equal to the amount of current at the output 21c. The emitter terminal of the transistor 215 is electrically connected to the input 21a via the resistance element 211. The emitter terminal of the transistor 217 is electrically connected to the input 21a via the resistance element 213. The input 21a of the current mirror circuit 21 is electrically connected to the output 7c of the DC-DC converter 7, and receives the supply voltage P1 from the DC-DC converter 7. The base terminal of the transistor 215 and that of the transistor 217 are electrically connected to each other via a node 219. The node 219 is electrically connected to the collector terminal of the transistor 217. The collector terminal of the transistor 215 is electrically connected to the output 21b of the current mirror circuit 21. The collector terminal of the transistor 217 is electrically connected to the cathodic electrode 11b of the APD 11 via the output 21c of the current mirror circuit 21. As described above, the anodic electrode 11c of the APD 11 is electrically connected to the amplifier 9.

The converting circuit 17 includes a buffer amplifier 171 and a resistance element 173. In addition, the converting circuit 17 has an input 17a and outputs 17b and 17c. One end of the resistance element 173 is electrically connected to the anodic electrode 13c of the PIN-PD 13 via a node 175 and the input 17a. The cathodic electrode 13b of the PIN-PD 13 is electrically connected to a power-supply terminal of a predetermined voltage (for example, 3.3 V). The other end of the resistance element 173 is electrically connected to a reference voltage wire. A positive input terminal of the buffer amplifier 171 is electrically connected to the node 175, and a negative input terminal of the buffer amplifier 171 is electrically connected to an output terminal of the buffer amplifier 171. The output terminal of the buffer amplifier 171 is electrically connected to a monitor terminal via the output 17c, and is also electrically connected to one end of a resistance element 25 via the output 17b. The other end of the resistance element 25 is electrically connected to a reference voltage wire via a node 27 and a diode 23.

The voltage control circuit 19 includes an OP amplifier 191 and resistance elements 193 and 195. In addition, the voltage control circuit 19 has inputs 19a and 19c and an output 19b. A negative input terminal of the OP amplifier 191 is electrically connected to the node 27 via the input 19a, and is also electrically connected to an output terminal of the OP amplifier 191 via the resistance element 195. The output terminal of the OP amplifier 191 is electrically connected to the input 7b of the DC-DC converter 7 via the output 19b of the voltage control circuit 19. A positive input terminal of the OP amplifier 191 is electrically connected to a node 197. The node 197 is electrically connected to a reference voltage wire via the resistance element 193, and is also electrically connected to the output 21b of the current mirror circuit 21 via the input 19c of the voltage control circuit 19.

Next, the operation of the optical receiver 1 according to the present embodiment will be described below. With reference to FIG. 3 again, the signal light L1 transmitted through the optical fiber 37 is incident on the light-receiving part 3. In the light-receiving part 3, the half mirror 15 divides the signal light L1 into the signal light L2 and the signal light L3. The signal light L2 passes through the half mirror 15, travels straight, and is incident on the APD 11 in the APD module 33. The signal light L3 is reflected by the reflective surface 15a of the half mirror 15, and is incident on the PIN-PD 13 in the PIN-PD module 35.

With reference to FIG. 5 again, a reverse bias voltage of 3.3 V is applied between the cathodic electrode 13b and the anodic electrode 13c of the PIN-PD 13, and the output current I2 corresponding to the quantity of signal light L3 flows when the signal light L3 is incident on the PIN-PD 13. The output current I2 is input to the converting circuit 17, flows through the node 175 and the resistance element 173, and reaches the reference voltage wire. Accordingly, a potential V1 is generated at the node 175 by the resistance element 173. The potential V1 is input to the buffer amplifier 171, and thus a voltage signal S2 corresponding to the quantity of signal light L3 is generated.

The voltage signal S2 generated in the converting circuit 17 is output from the output 17b of the converting circuit 17, and is input to the voltage control circuit 19 via the resistance element 25 and the node 27. The diode 23 is designed to serve to prevent the OP amplifier 191 from receiving an excessive amount of current if an excessive quantity of light is input to the PIN-PD 13 and the voltage value of the voltage signal S2 exceeds a predetermined limit.

The supply voltage P1 is applied as a reverse bias voltage via the current mirror circuit 21 by the DC-DC converter 7 between the cathodic electrode 11b and the anodic electrode 11c of the APD 11. When the signal light L2 is incident on the APD 11, the output current I1 corresponding to the quantity of signal light L2 flows in the APD 11. The amplifier 9 generates the received signal S1 by converting the output current I1 into a voltage signal, and the received signal S1 is supplied to the outside of the optical receiver 1. At this time, the current mirror circuit 21 operates such that the amount of current I3 which flows through the resistance element 211 and the transistor 215 is substantially equal to the amount of current I1 which flows through the resistance element 213 and the transistor 217. The current I3 is output from the output 21b of the current mirror circuit 21, flows through the input 19c of the voltage control circuit 19, the node 197, and the resistance element 193, in that order, and reaches the reference voltage wire. When the current I3 flows through the resistance element 193 of the voltage control circuit 19, a potential V2 is generated at the node 197. The potential V2 is input to the positive input terminal of the OP amplifier 191.

In addition, the voltage signal S2 generated by the converting circuit 17 and input to the voltage control circuit 19 is supplied to the negative terminal of the OP amplifier 191. Since the output terminal of the OP amplifier 191 is fed back to the negative input terminal of the OP amplifier 191 via the resistance element 195, the difference between the voltage signal S2 and the potential V2 is amplified with a predetermined factor, and the control signal S3 is thus generated. More specifically, the value of the control signal S3 increases as the ratio of the current value of the output current I1 from the APD 11 to that of the output current I2 from the PIN-PD 13 deviates from a predetermined ratio. When the DC-DC converter 7 receives the control signal S3 from the voltage control circuit 19, it adjusts the voltage value of the supply voltage P1 such that the value of the control signal S3 approaches 0.

Due to the above-described operation, the supply voltage P1 applied to the APD 11 is controlled and the avalanche multiplication factor m of the APD 11 is maintained at the desired value. In the present embodiment, the resistance of the resistance element 193 may be determined on the basis of the product of the ratio of $Iava_2$ to $Ipin_2$ and the desired avalanche multiplication factor m $(=m \cdot (Iava_2/Ipin_2))$, where $Iava_2$ is a measured current value of the output current I1 obtained by the APD 11 in the PIN mode when a quantity of light is incident, and Ipin2 is a measured current value of the output current I2 obtained by the PIN-PD 13 at that time. The avalanche multiplication factor m can be changed by changing the resistance of the resistance element 193. When the resistance element 193 is used as a digital potentiometer, the avalanche multiplication factor m can be changed by an external signal. Examples of parameters used in the circuit diagram of FIG. 5 are shown below:

Output Current I1: 10 μA (Quantity of Signal Light L2: 0.95 μW)
Output Current I2: 50 nA (Quantity of Signal Light L3: 0.05 μW)
Current I3: 10 μA
Resistance Element 173: 100 kΩ
Resistance Element 193: 500 kΩ
Resistance Element 195: Preferably large enough to prevent the
oscillation of a closed-loop relating to the OP amplifier 191.
Resistance Element 211: 1 kΩ
Resistance Element 213: 1 kΩ
Supply Voltage P1: 50 V
Potential V1: 5 mV
Potential V2: 5 mV As for the resistance elements 211, 213, and 193, and the current I3, the following parameters may be adopted instead of those mentioned above. In this case, the power consumption of the DC-DC converter 7 can be reduced to 11/20 compared to the case of the above-mentioned parameters.

Current I3: 1 μA
Resistance Element 211: 10 kΩ
Resistance Element 213: 1 kΩ
Resistance Element 193: 5 MΩ

The optical receiver according to the present embodiment provides the following advantages. That is, in the optical receiver 1 according to the present embodiment, the signal light L1 is divided by the half mirror 15 on which the multilayer film for reducing the polarization dependency is formed. Accordingly, the signal light L2 and the signal light L3 are incident on the APD 11 and the PIN-PD 13, respectively, without the quantities thereof being varied depending on the polarization state of the signal light L1. Furthermore, crosstalk between the APD 11 and the PIN-PD 13 can be prevented by disposing the APD 11 and the PIN-PD 13 separately from each other. Thus, in the optical receiver 1 of the present embodiment, the avalanche multiplication factor of the APD 11 can be accurately controlled on the basis of the output current I2 of the PIN-PD 13.

In addition, in order to maintain the avalanche multiplication factor m of the APD 11 at a predetermined value, the optical receiver 1 according to the present embodiment is provided with the control part 5 for controlling, on the basis of the current value of the output current I2 from the PIN-PD 13, the supply voltage P1 applied to the APD 11. It is preferable that the optical receiver 1 includes the above-described control part 5, because the avalanche multiplication factor m of the APD 11 can thereby suitably be controlled.

First Modification

Figure 6:
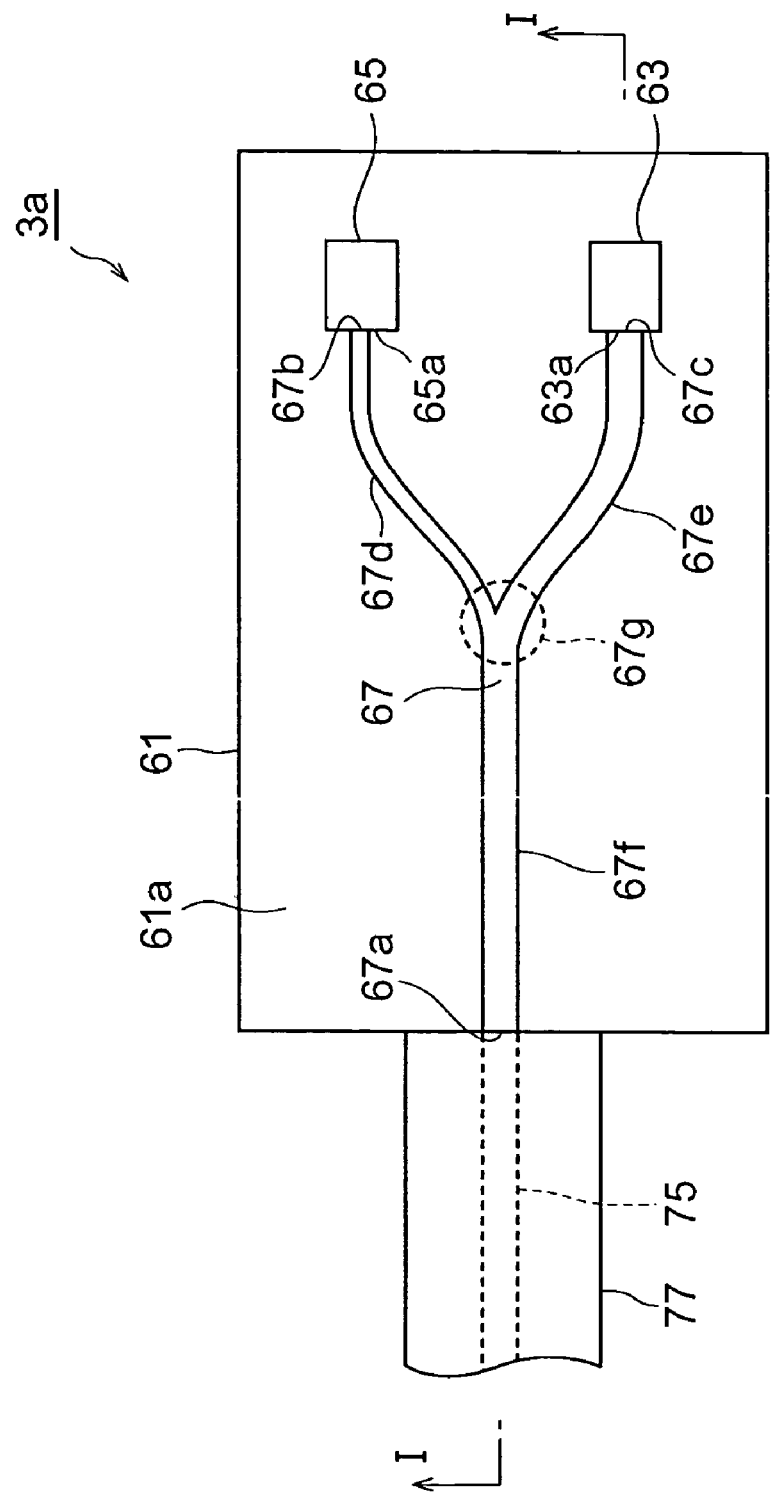
FIG. 6 is a plan view showing a light-receiving part according to a first modification of the optical receiver.
Figure 7:
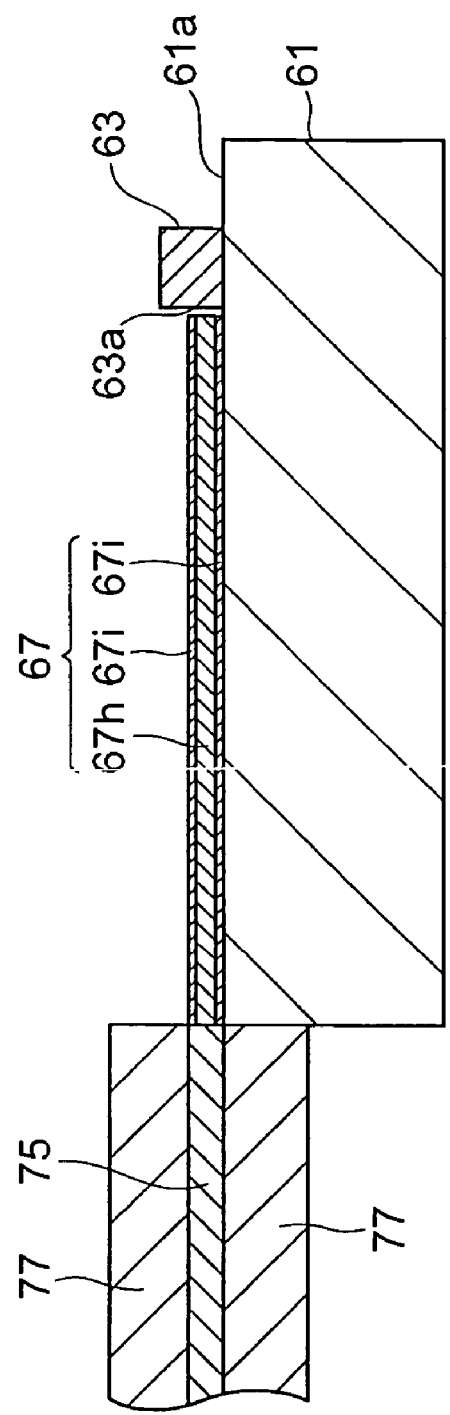
FIG. 7 is a sectional view of the light-receiving part, showing a cross-section taken along the line I-I in FIG. 6.

FIG. 6 is a plan view showing a light-receiving part 3a as a first modification of the optical receiver 1 according to the above-described embodiment. FIG. 7 is a sectional view of the light-receiving part 3a, illustrating a cross-section taken along line I-I in FIG. 6. With reference to FIGS. 6 and 7, the light-receiving part 3a includes a substrate 61, an APD 63, a PIN-PD 65, and an optical waveguide 67. The substrate 61 has a principal plane 61a, and the APD 63, the PIN-PD 65, and the optical waveguide 67 are provided on the principal plane 61a of the substrate 61. The APD 63 and the PIN-PD 65 are disposed separately from each other.

A first end 67a of the optical waveguide 67 is positioned at an edge of the substrate 61, and is optically coupled to an optical fiber 75. The optical fiber 75 is retained by a ferrule 77 at an end thereof. The optical waveguide 67 branches off in two directions, toward a second end 67c and a third end 67b. More specifically, the optical waveguide 67 includes a first portion 67f extending from the first end 67a to a branching-off point 67g, a second portion 67e extending from the branching-off point 67g to the second end 67c, and a third portion 67d extending from the branching-off point 67g to the third end 67b. The second end 67c of the optical waveguide 67 is optically coupled to a light-receiving area 63a of the APD 63. The third end 67b of the optical waveguide 67 is optically coupled to a light-receiving area 65a of the PIN-PD 65. In the optical waveguide 67, the ratio of the quantity of signal light passing through the second portion 67e to the quantity of signal light passing through the third portion 67d is preferably in the range of 9:1 to 99:1.

In addition, with reference to FIG. 7, the optical waveguide 67 includes a core 67h and a cladding layer 67i. The core 67h is composed of a material whose refractive index is higher than that of the material of the cladding layer 67i. Accordingly, signal light which enters the optical waveguide 67 at the first end 67a from the optical fiber 75 is mainly trapped in the core 67h and is adequately guided through the optical waveguide 67.

The optical receiver of the present invention may include the light-receiving part 3a according to the present modification in place of the light-receiving part 3 shown in FIG. 3. Also in this case, advantages similar to those of the above-described embodiment are provided. More specifically, in the present modification, the signal light L1 is divided at the branching-off point 67g of the optical waveguide 67. Therefore, the signal light L2 and the signal light L3 are incident on the APD 63 and the PIN-PD 65, respectively, without the quantities of the signal light L2 and the signal light L3 being varied depending on the polarization state of the signal light L1. In addition, since the APD 63 and the PIN-PD 65 are disposed separately from each other, crosstalk between the APD 63 and the PIN-PD 65 is prevented. Thus, according to the present modification, the avalanche multiplication factor of the APD 63 can be accurately controlled on the basis of the output current I2 of the PIN-PD 65.

Second Modification

Figure 8:
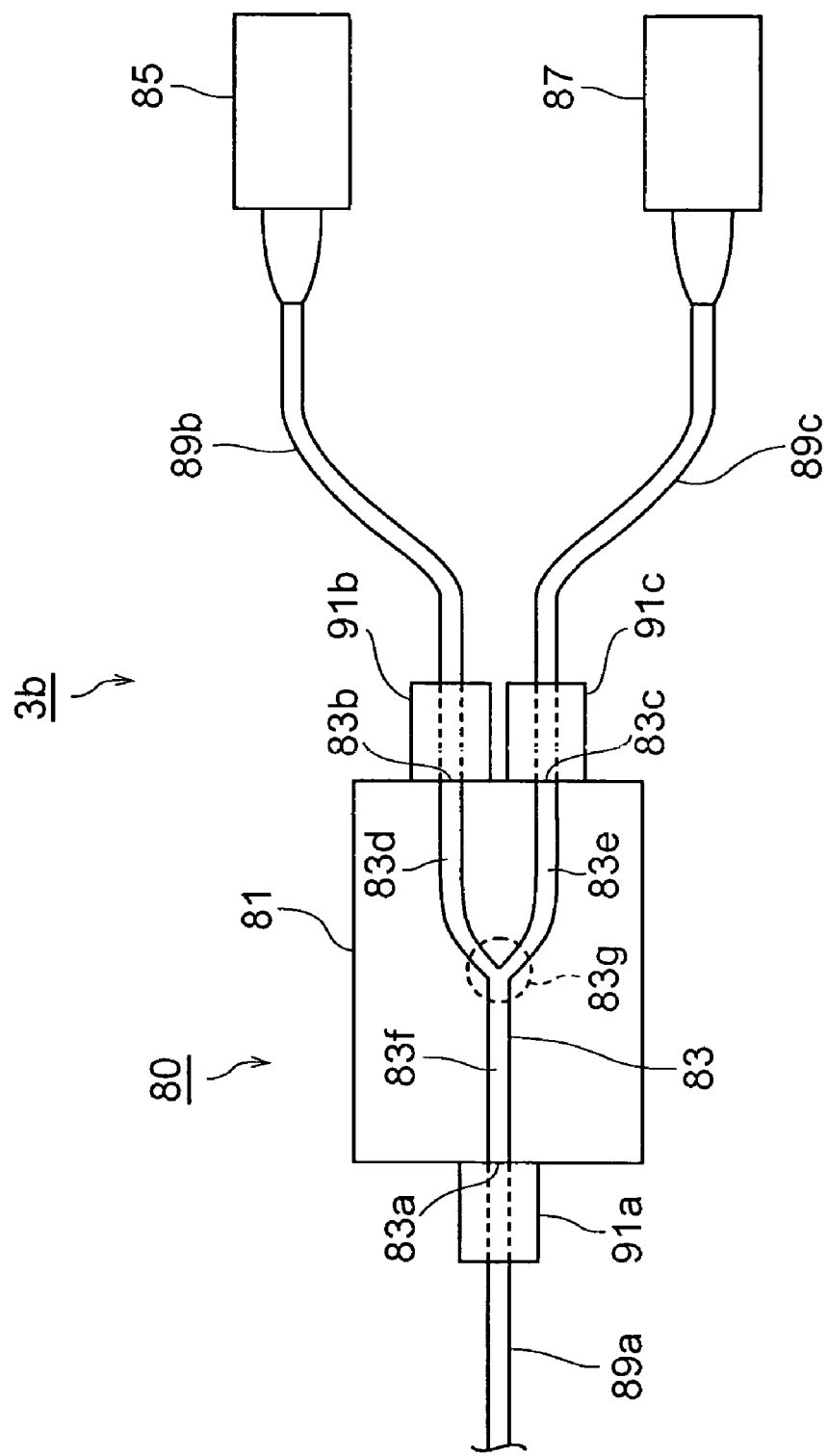
FIG. 8 is a plan view of a light-receiving part according to a second modification of the optical receiver.

FIG. 8 is a plan view showing a light-receiving part 3b as a second modification of the optical receiver 1 according to the above-described embodiment. With reference to FIG. 8, the light-receiving part 3b includes an optical coupler 80, an APD module 87, and a PIN-PD module 85. In the present modification, the APD module 87 and the PIN-PD module 85 have a so-called pigtail configuration, and an APD and a PIN-PD are included in the APD module 87 and the PIN-PD module 85, respectively.

The optical coupler 80 includes an optical fiber 83 and a container 81 for accommodating the optical fiber 83. The optical fiber 83 serves an optical waveguide in the present modification. A first end 83a of the optical fiber 83 is optically coupled to an optical fiber 89a. In addition, the optical fiber 83 branches off in two directions, toward a second end 83c and a third end 83b. More specifically, the optical fiber 83 includes a first portion 83f extending from the first end 83a to a branching-off point 83g, a second portion 83e extending from the branching-off point 83g to the second end 83c, and a third portion 83d extending from the branching-off point 83g to the third end 83b. The second end 83c of the optical fiber 83 is optically coupled to one end of an optical fiber 89c, and the other end of the optical fiber 89c is optically coupled to the APD module 87. The third end 83b of the optical fiber 83 is optically coupled to one end of another optical fiber 89b, and the other end of the optical fiber 89b is optically coupled to the PIN-PD module 85. The optical fibers 89a to 89c are retained by ferrules 91a to 91c, respectively, at ends thereof. In the optical coupler 80, the ratio of the quantity of signal light passing through the second end 83c of the optical fiber 83 to the quantity of signal light passing through the third end 83b of the optical fiber 83 is preferably in the range of 9:1 to 99:1.

The optical receiver 1 shown in FIG. 1 may include the light-receiving part 3b according to the present modification in place of the light-receiving part 3 shown in FIG. 3. Also in this case, advantages similar to those of the above-described embodiment can be obtained.

Third Modification

Figure 9:
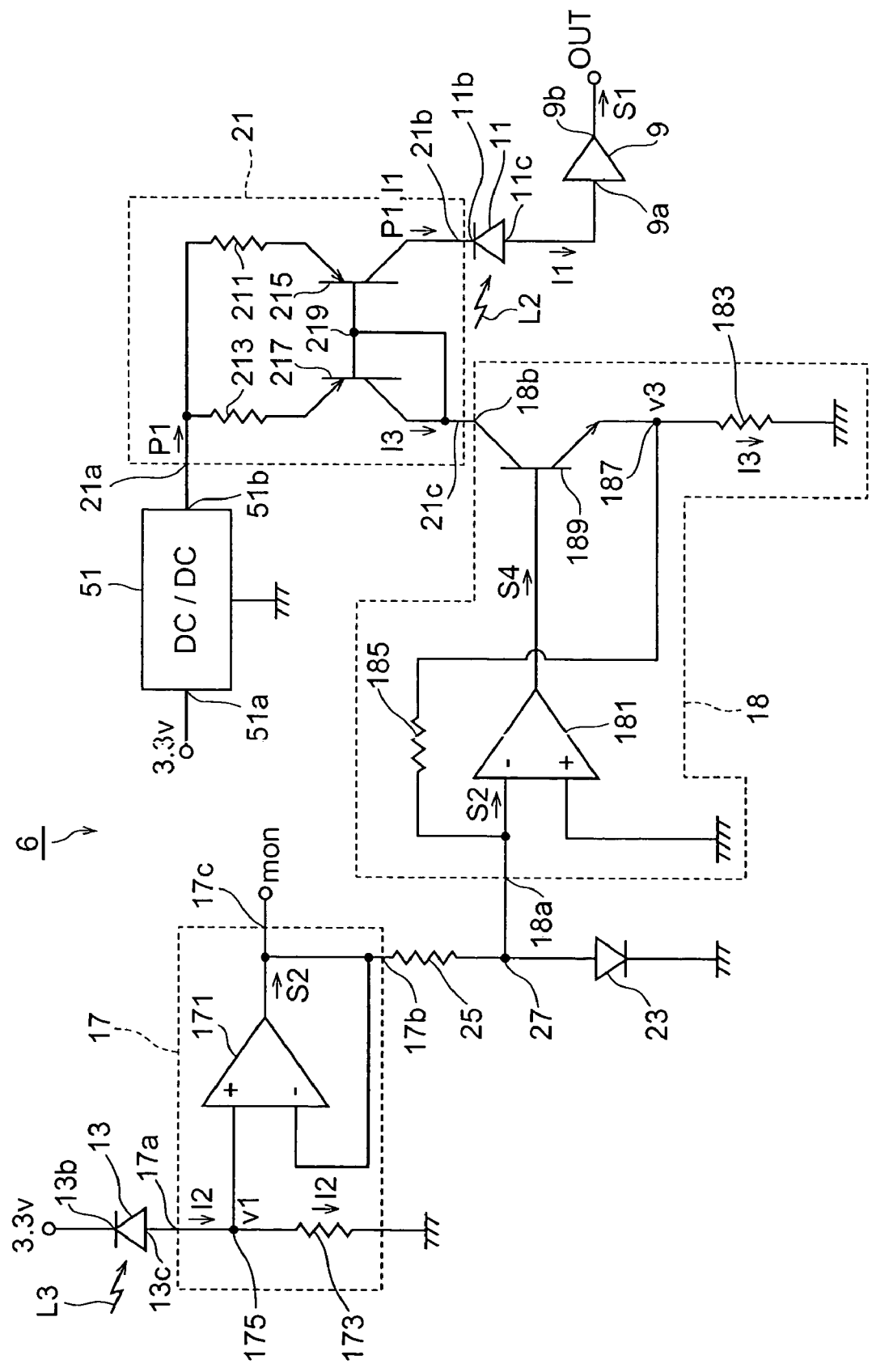
FIG. 9 is a circuit diagram showing an internal circuit of a control part according to a third modification of the optical receiver.
Figure 10A:
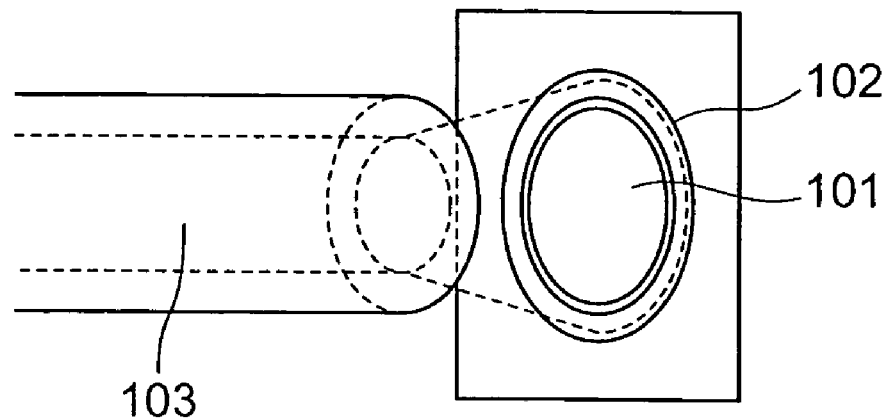
FIGS. 10(a) and 10(b) are diagrams showing known optical receivers.
Figure 10B:
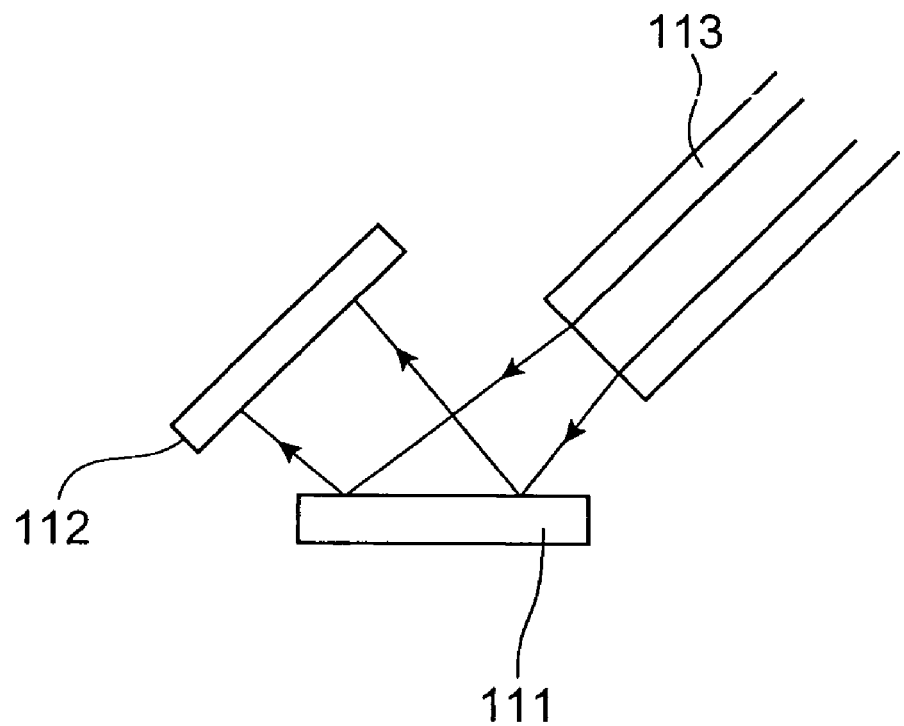

FIG. 9 is a circuit diagram showing an internal circuit of a control part 6 as a third modification of the optical receiver 1 according to the above-described embodiment. The structure of the control part 6 according to the present modification is similar to that of the control part 5 according to the above-described embodiment except for the following points. That is, the control part 6 according to the present modification includes a current control circuit 18 and a DC-DC converter 51 in place of the voltage control circuit 19 and the DC-DC converter 7, respectively, of the above-described embodiment. In addition, different from the above-described embodiment, in the control part 6 according to the present modification, an output 21b (second output) of a current mirror circuit 21 is electrically connected to a cathodic electrode 11b of an APD 11 and an output 21c (first output) of the current mirror circuit 21 is electrically connected to the current control circuit 18.

The current control circuit 18 includes an OP amplifier 181, resistance elements 183 and 185, and an NPN transistor 189. In addition, the current control circuit 18 has inputs 18a and 18b. A negative input terminal of the OP amplifier 181 is electrically connected to a node 27 via the input 18a, and is also electrically connected to a node 187 via the resistance element 185. A positive input terminal of the OP amplifier 181 is electrically connected to a reference voltage wire. An output terminal of the OP amplifier 181 is electrically connected to the base terminal of the transistor 189. The collector terminal of the transistor 189 is electrically connected to the output 21c of the current mirror circuit 21 via the input 18b. The emitter terminal of the transistor 189 is electrically connected to a reference voltage wire via the node 187 and the resistance element 183.

The DC-DC converter 51 functions as a power supply circuit in the present modification, and has an input 51a and an output 51b. The input 51a is electrically connected to a power-supply terminal of a predetermined voltage (for example, 3.3 V). The output 51b is electrically connected to an input 21a of the current mirror circuit 21. Different from the DC-DC converter 7 according to the above-described embodiment, the DC-DC converter 51 converts the supply voltage obtained from the power-supply terminal into a predetermined supply voltage P1 (for example, 80V). Then, the DC-DC converter 51 supplies the supply voltage P1 to the current mirror circuit 21 from the output 51b.

Next, the operation of the present modification will be described below. In the following description, explanations similar to those of the optical receiver 1 according to the above-described embodiment are omitted.

When signal light L3 is incident on a PIN-PD 13, a voltage signal S2 is generated by a converting circuit 17 and is input to the current control circuit 18. The voltage signal S2 is input to the negative terminal of the OP amplifier 181. Then, the OP amplifier 181 generates a control signal S4. The control signal S4 is input to the base terminal of the transistor 189, and a current I3 corresponding to the control signal S4 flows between the collector terminal and the emitter terminal of the transistor 189. When the current I3 flows through the resistance element 183, a potential V3 is generated at the node 187 and the potential V3 is fed back to the negative input terminal of the OP amplifier 181 via the resistance element 185. Accordingly, the voltage of the control signal S4 becomes equal to the product of a predetermined factor and the voltage of the voltage signal S2, and the amount of current I3 is determined depending on the control signal S4.

The supply voltage P1 as a reverse bias voltage is applied between the cathodic electrode 11b and the anodic electrode 11c of the APD 11 by the DC-DC converter 51 via the current mirror circuit 21. When signal light L2 is incident on the APD 11, an output current I1 flows in the APD 11. At this time, the current mirror circuit 21 operates such that the amount of output current I1 which flows through a resistance element 211 and a transistor 215 is substantially equal to the amount of current I3 which flows through a resistance element 213 and a transistor 217. That is, the amount of output current I1 which flows into the APD 11 is substantially equal to the amount of current I3, since the amount of current I3 is controlled by the current control circuit 18 as described above. An amplifier 9 generates a received signal S1 by converting the output current I1 into a voltage signal, and the received signal S1 is supplied to the outside of the optical receiver 1.

As a result of the above-described operation, the output current I1 of the APD 11 is controlled, and the avalanche multiplication factor m of the APD 11 can be maintained at the desired value. As in the above-described embodiment, also in the present modification, the current value of the output current I1 obtained by the APD 11 in the PIN mode when a predetermined quantity of light is incident (=Iava$_2$) and the current value of the output current I2 obtained by the PIN-PD 13 at that time (=Ipin$_2$) may be measured first, and thereafter the resistance of the resistance element 183 may be set on the basis of m·(Iava$_2$/Ipin$_2$), that is, the product of the ratio of Iava$_2$ to Ipin$_2$ and the desired avalanche multiplication factor m.

In the present modification, the output current I1 which flows in the APD 11 is controlled by the control part 6 on the basis of the current value of the output current I2 from the PIN-PD 13 such that the avalanche multiplication factor m of the APD 11 is maintained at a predetermined value. Thus, also in the case of the optical receiver 1 including such control part 6, the avalanche multiplication factor of the APD 11 can be suitably controlled.

The optical receiver according to the present invention is not limited to the above-described embodiment and modifications, and other various modifications are possible. For example, although the signal light is divided such that the ratio of the quantity of signal light input to the APD to the quantity of signal light input to the PIN-PD is in the range of 9:1 to 99:1, the ratio may also be set to other desired values. In the above-described embodiment, the control part controls the supply voltage applied to the APD, and in the third modification, the control part controls the amount of current which flows in the APD. However, the control means may control both the supply voltage and the current at the same time.

What is claimed is:

1. An optical receiver for receiving signal light, comprising:
    an avalanche photodiode having a light-receiving area;
    a PIN photodiode having a light-receiving area and disposed separately from the avalanche photodiode;
    a half mirror for receiving the signal light and dividing the signal light into two signal-light components, the half mirror being optically coupled to the light-receiving area of the avalanche photodiode and the light-receiving area of the PIN photodiode such that one of the signal-light components is incident on the light-receiving area of the avalanche photodiode and the other signal-light component is incident on the light-receiving area of the PIN photodiode; and
    a control means for controlling, on the basis of an output current value obtained from the PIN photodiode, one or both of a supply voltage applied to the avalanche photodiode and a current which flows through the avalanche photodiode such that an avalanche multiplication factor of the avalanche photodiode is maintained at a predetermined value.

2. The optical receiver according to claim 1, wherein the control means controls either one or both of the supply voltage applied to the avalanche photodiode and the current flowing through the avalanche photodiode such that an average output current value obtained from the avalanche photodiode when the signal light is incident approaches m·Ipin1·(Iava$_2$/Ipin$_2$), where Iava$_2$ is an output current value of the avalanche photodiode in a PiN mode and Ipin$_2$ is an output current value of the PIN photodiode, respectively, when a quantity of light is incident, and m is a desired avalanche multiplication factor, and Ipin1 is the output current value of the PIN photodiode.

3. The optical receiver according to claim 2, wherein the control means comprises:
    a converting circuit for converting the output current value obtained from the PIN photodiode into a voltage signal;
    a current mirror circuit having an input, a first output, and a second output, the amount of current at the second output being designed to be substantially equal to the amount of current at the first output and the first output being connected to the avalanche photodiode;
    a power supply circuit for supplying the supply voltage to the input of the current mirror circuit; and
    a voltage control circuit for controlling the supply voltage on the basis of the voltage signal obtained from the converting circuit and the amount of current at the second output of the current mirror circuit.

4. The optical receiver according to claim 2, wherein the control means includes:
    a converting circuit for converting the output current value obtained from the PIN photodiode into a voltage signal;
    a current mirror circuit having an input, a first output, and a second output, the amount of current at the second output being designed to be substantially equal to the amount of current at the first output and the second output being connected to the avalanche photodiode;
    a power supply circuit for supplying the supply voltage to the input of the current mirror circuit; and
    a current control circuit for controlling the amount of current at the first output of the current mirror circuit on the basis of the voltage signal obtained from the converting circuit.

5. The optical receiver according to claim 1, wherein the control means comprises:
    a converting circuit for converting the output current value obtained from the PIN photodiode into a voltage signal;
    a current mirror circuit having an input, a first output, and a second output, the amount of current at the second output being designed to be substantially equal to the amount of current at the first output and the first output being connected to the avalanche photodiode;
    a power supply circuit for supplying the supply voltage to the input of the current mirror circuit; and
    a voltage control circuit for controlling the supply voltage on the basis of the voltage signal obtained from the converting circuit and the amount of current at the second output of the current mirror circuit.

6. The optical receiver according to claim 1, wherein the control means includes:
    a converting circuit for converting the output current value obtained from the PIN photodiode into a voltage signal;
    a current mirror circuit having an input, a first output, and a second output, the amount of current at the second output being designed to be substantially equal to the amount of current at the first output and the second output being connected to the avalanche photodiode;
    a power supply circuit for supplying the supply voltage to the input of the current mirror circuit; and
    a current control circuit for controlling the amount of current at the first output of the current mirror circuit on the basis of the voltage signal obtained from the converting circuit.

7. An optical receiver for receiving signal light, comprising:
- an avalanche photodiode having a light-receiving area;
- a PIN photodiode having a light-receiving area and disposed separately from the avalanche photodiode;
- an optical waveguide including a first portion extending from a first end at which the signal light enters the optical waveguide to a branching-off point, a second portion extending from the branching-off point to a second end, and a third portion extending from the branching-off point to a third end, the second end of the optical waveguide being optically coupled to the light-receiving area of the avalanche photodiode and the third end of the optical waveguide being optically coupled to the light-receiving area of the PIN photodiode; and
- a control means for controlling, on the basis of an output current value obtained from the PIN photodiode, one or both of a supply voltage applied to the avalanche photodiode and a current which flows through the avalanche photodiode such that an avalanche multiplication factor of the avalanche photodiode is maintained at a predetermined value.

8. The optical receiver according to claim 7, wherein the control means controls either one or both of the supply voltage applied to the avalanche photodiode and the current flowing through the avalanche photodiode such that an average output current value obtained from the avalanche photodiode when the signal light is incident approaches $m \cdot Ipin1 \cdot (Iava_2/Ipin_2)$, where $Iava_2$ is an output current value of the avalanche photodiode in a PIN mode and $Ipin_2$ is an output current value of the PIN photodiode, respectively, when a quantity of light is incident, and m is a desired avalanche multiplication factor, and $Ipin1$ is the output current value of the PIN photodiode.

9. The optical receiver according to claim 8, wherein the control means comprises:
- a converting circuit for converting the output current value obtained from the PIN photodiode into a voltage signal;
- a current mirror circuit having an input, a first output, and a second output, the amount of current at the second output being designed to be substantially equal to the amount of current at the first output and the first output being connected to the avalanche photodiode;
- a power supply circuit for supplying the supply voltage to the input of the current mirror circuit; and
- a voltage control circuit for controlling the supply voltage on the basis of the voltage signal obtained from the converting circuit and the amount of current at the second output of the current mirror circuit.

10. The optical receiver according to claim 8, wherein the control means includes:
- a converting circuit for converting the output current value obtained from the PIN photodiode into a voltage signal;
- a current mirror circuit having an input, a first output, and a second output, the amount of current at the second output being designed to be substantially equal to the amount of current at the first output and the second output being connected to the avalanche photodiode;
- a power supply circuit for supplying the supply voltage to the input of the current mirror circuit; and
- a current control circuit for controlling the amount of current at the first output of the current mirror circuit on the basis of the voltage signal obtained from the converting circuit.

11. The optical receiver according to claim 7, wherein the control means comprises:
- a converting circuit for converting the output current value obtained from the PIN photodiode into a voltage signal;
- a current mirror circuit having an input, a first output, and a second output, the amount of current at the second output being designed to be substantially equal to the amount of current at the first output and the first output being connected to the avalanche photodiode;
- a power supply circuit for supplying the supply voltage to the input of the current mirror circuit; and
- a voltage control circuit for controlling the supply voltage on the basis of the voltage signal obtained from the converting circuit and the amount of current at the second output of the current mirror circuit.

12. The optical receiver according to claim 7, wherein the control means includes:
- a converting circuit for converting the output current value obtained from the PIN photodiode into a voltage signal;
- a current mirror circuit having an input, a first output, and a second output, the amount of current at the second output being designed to be substantially equal to the amount of current at the first output and the second output being connected to the avalanche photodiode;
- a power supply circuit for supplying the supply voltage to the input of the current mirror circuit; and
- a current control circuit for controlling the amount of current at the first output of the current mirror circuit on the basis of the voltage signal obtained from the converting circuit.

* * * * *

UNITED STATES PATENT AND TRADEMARK OFFICE
CERTIFICATE OF CORRECTION

| | | |
|---|---|---|
| PATENT NO. | : 7,366,428 B2 | Page 1 of 1 |
| APPLICATION NO. | : 10/940529 | |
| DATED | : April 29, 2008 | |
| INVENTOR(S) | : Yoshiki Kuhara, Mitsuaki Nishie and Shigeo Hayashi | |

It is certified that error appears in the above-identified patent and that said Letters Patent is hereby corrected as shown below:

Column 13, claim 2, line 63, "PiN mode" should be --PIN mode--.

Signed and Sealed this

Fifth Day of August, 2008

JON W. DUDAS
*Director of the United States Patent and Trademark Office*